United States Patent [19]

Bunker

[11] Patent Number: 5,788,206

[45] Date of Patent: *Aug. 4, 1998

[54] AUTOMOTIVE TRANSMISSION MOUNT

[76] Inventor: Donald D. Bunker, 28182 Palmada, Mission Viejo, Calif. 92692

[*] Notice: The term of this patent shall not extend beyond the expiration date of Pat. No. 5,551,661.

[21] Appl. No.: 678,584

[22] Filed: Jul. 11, 1996

Related U.S. Application Data

[63] Continuation-in-part of Ser. No. 322,091, Oct. 11, 1994, Pat. No. 5,551,661.

[51] Int. Cl.$^6$ ............................................. F16M 13/00
[52] U.S. Cl. .......................... 248/634; 248/638; 267/141; 267/153
[58] Field of Search .............................. 248/634, 635, 248/638, 674, 222.3; 180/299, 300, 312, 377; 267/141, 153; 403/220, 221

[56] References Cited

U.S. PATENT DOCUMENTS

| | | |
|---|---|---|
| 1,844,735 | 2/1932 | Geyer et al. . |
| 1,930,310 | 10/1933 | Geyer et al. . |
| 2,138,176 | 11/1938 | Keys . |
| 2,308,962 | 1/1943 | Riesing . |
| 5,031,873 | 7/1991 | Rau .................... 248/632 |
| 5,215,382 | 6/1993 | Kemeny . |
| 5,295,671 | 3/1994 | Nakagaki et al. . |
| 5,303,896 | 4/1994 | Sterka ................. 248/634 X |
| 5,551,661 | 9/1996 | Bunker ................. 248/634 |

FOREIGN PATENT DOCUMENTS

| | | |
|---|---|---|
| 468165 | 6/1937 | United Kingdom . |
| 672578 | 5/1952 | United Kingdom . |

Primary Examiner—Ramon O. Ramirez
Assistant Examiner—Derek J. Berger
Attorney, Agent, or Firm—Stetina Brunda Garred & Brucker

[57] ABSTRACT

An automotive transmission mount comprising a top plate which is configured for attachment to a transmission housing and defines top and bottom surfaces. Interlocked to the top plate is a bottom plate which is configured for attachment to a vehicle frame. Disposed between the top and bottom plates is a resilient material such as polyurethane which includes an upwardly extending portion protruding beyond the top surface of the top plate. The upwardly extending portion is adapted to be compressed so as to apply a preload to the bottom plate.

18 Claims, 2 Drawing Sheets

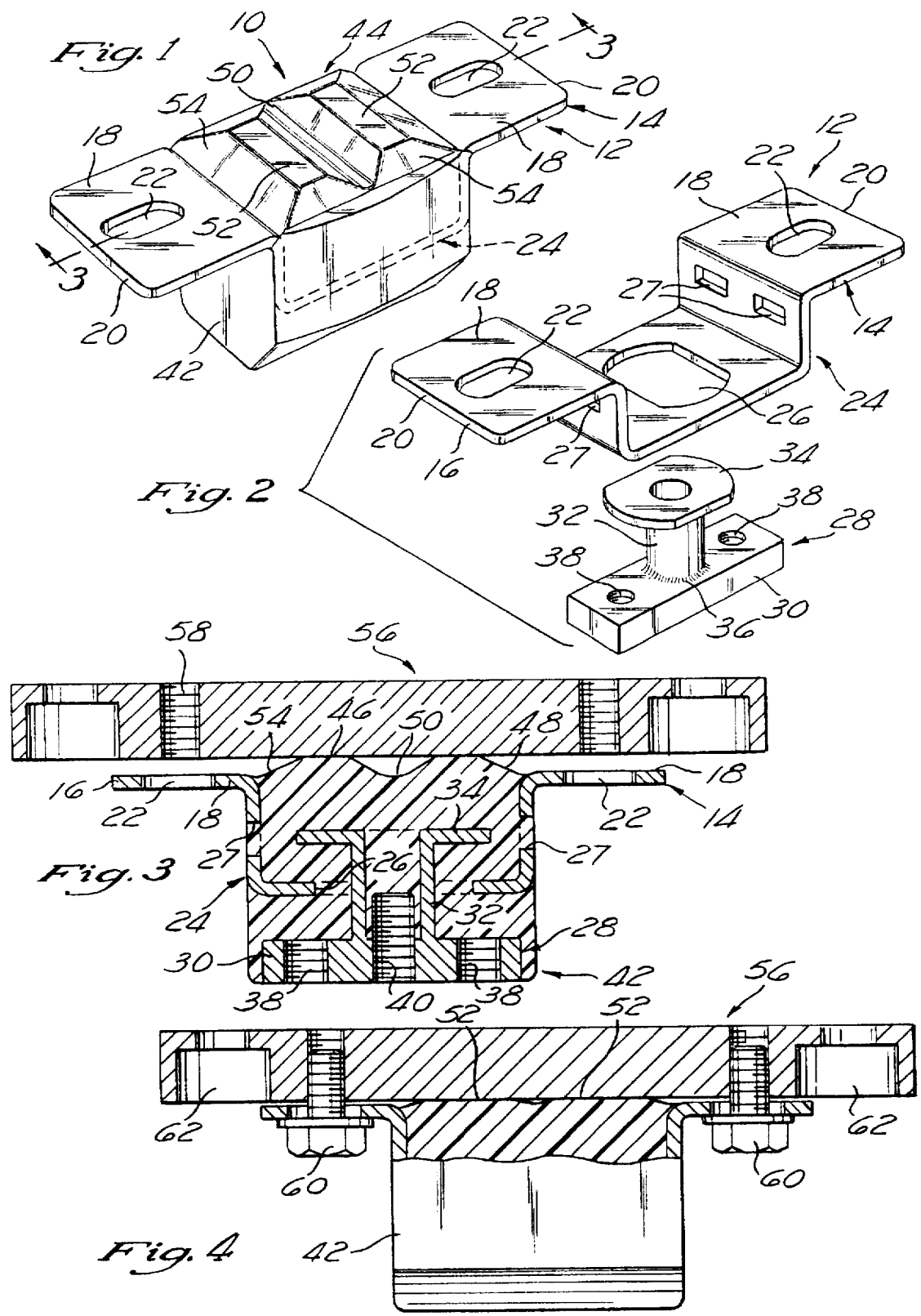

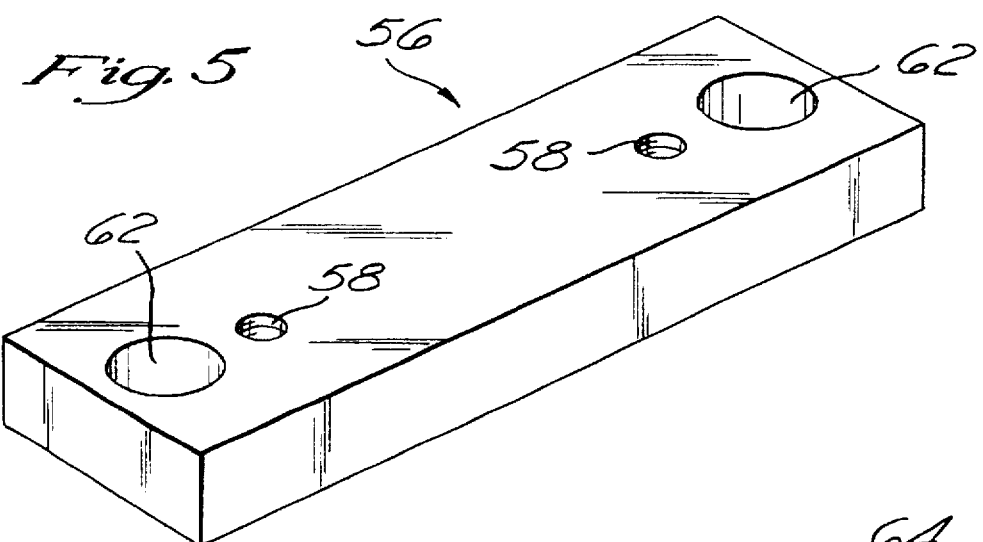
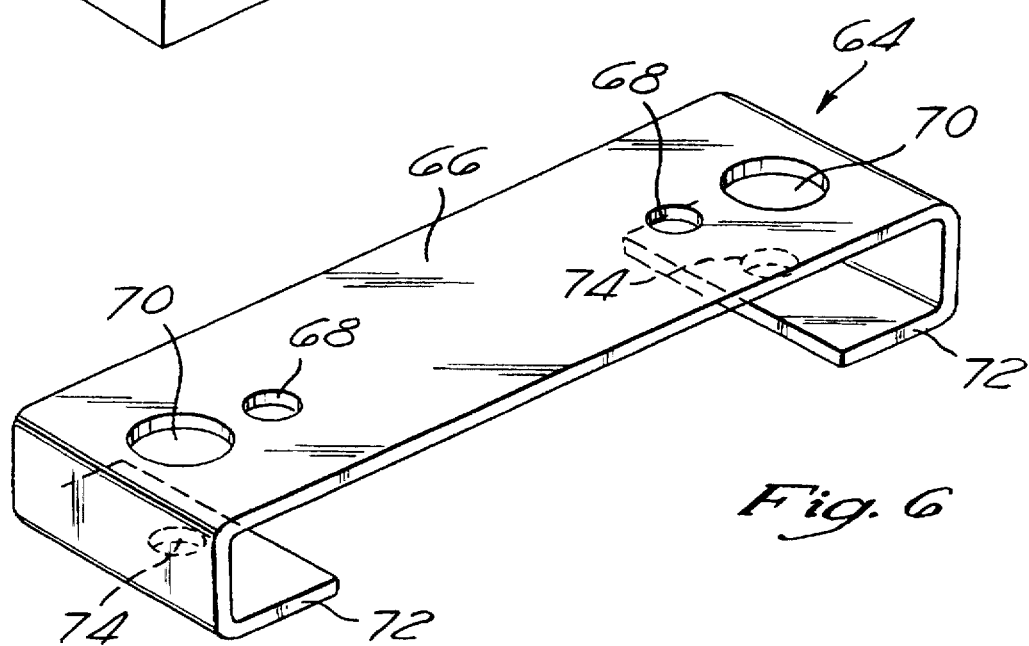
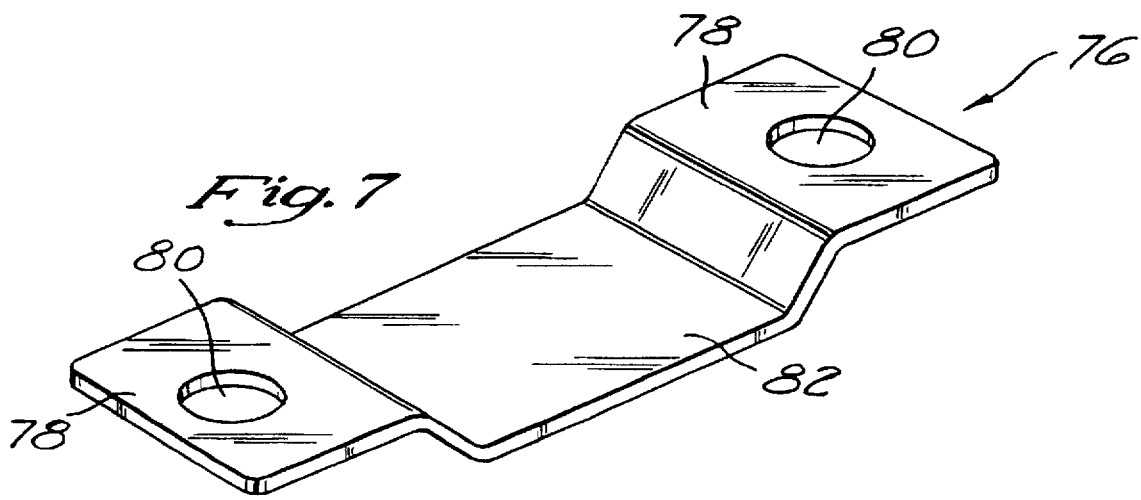

AUTOMOTIVE TRANSMISSION MOUNT

FIELD OF THE INVENTION

The present application is a continuation-in-part of U.S. application Ser. No. 08/322,091 filed Oct. 11, 1994 now U.S. Pat. No. 5,551,661. The present invention relates generally to automotive mounting devices, and more particularly to an automotive transmission mount having interlocking top and bottom plates with a resilient material such as polyurethane disposed therebetween.

BACKGROUND OF THE INVENTION

Automotive transmissions are normally installed in trucks and automobiles by mounting them on a cross-arm attached to the frame of the vehicle. A transmission mount, normally consisting of two horizontal metal plates attached to each other via a rubber-filled core, is inserted between the bottom of the transmission housing and the top of the cross-arm to provide support and shock-absorption for the transmission. In most vehicles, the top plate of the mount is secured to the bottom of the transmission housing by the extension studs or bolts protruding downwardly from the transmission housing in spaced relation into respective openings formed within the top plate. The bottom plate of the mount is secured to the cross-arm attached to the frame of the vehicle. In prior art transmission mounts, the bottom plate typically includes one, two or three studs or bolts protruding therefrom, or alternatively one or more internally threaded apertures formed therein. In those transmission mounts wherein the bottom plate includes one or more bolts extending therefrom, the same are received into respective apertures disposed within the cross-arm. In those transmission mounts wherein the bottom plate includes one or more apertures formed therein, the same are sized and configured to receive respective studs or bolts protruding upwardly from the cross-arm.

In use, the prior art mount is first fastened to the top of the cross-arm by securing its bottom plate to the cross-arm. The transmission is then installed on top of the mount and secured to its top plate, as well as to other parts of the vehicle and its drive-train. Once so assembled, the transmission is firmly braced and supported by the cross-arm through the mount, which also provides shock absorption to alleviate the effects of vibrations during the operation of the vehicle.

One example of a prior art automotive transmission mount is disclosed in U.S. Pat. No. 5,251,865, issued to Kelly on Oct. 12, 1993. The Kelly patent discloses a transmission mount having a rubber core disposed intermediate a top plate configured for attachment to the transmission housing and a bottom plate configured for attachment to the supporting cross-arm of the vehicle frame.

Although such prior art automotive transmission mounts have proven generally suitable for their intended purposes, they possess inherent deficiencies which detract from their overall effectiveness in the marketplace. One example of such an inherent deficiency is readily apparent in the Kelly device wherein the upper and lower plates thereof do not interlock. Thus, deterioration and/or debonding of the rubber disposed therebetween can result in complete detachment of the upper plate from the lower plate, thereby rendering the Kelly automotive transmission mount ineffective.

Additionally, the Kelly automotive transmission mount, as is typical of prior art automotive transmission mounts, utilizes rubber as the resilient material thereof. As is well known to those skilled in the art, rubber is susceptible to degradation due to various environmental factors, such as contamination by various automotive fluids, e.g., gasoline, oil, transmission fluid, brake fluid, etc., as well as ozone and other atmospheric pollutants. Furthermore, rubber is incapable of applying a substantial preload to the upper and lower plates, so as to both desirably increase the stiffness of the mount and similarly increase the durability thereof.

As such, although the prior art has recognized to a limited extent the problem of bracing and supporting automotive transmissions to the frame cross-arm of a vehicle, the proposed solutions have, to date, been ineffective in providing a satisfactory remedy.

SUMMARY OF THE INVENTION

In accordance with the present invention, there is provided an automotive transmission mount comprising a top plate which is configured for attachment to a transmission housing and defines top and bottom surfaces. In addition to the top plate, the transmission mount of the present invention comprises a bottom plate which is configured for attachment to a vehicle frame, and in particular the cross-arm of the frame. Disposed between the top and bottom plates is a resilient material which includes an upwardly extending portion protruding beyond the top surface of the top plate.

The upwardly extending portion of resilient material defines first and second sections which are identically configured and separated by a trough. In particular, the first and second sections each preferably include a generally planar end surface which is circumvented by a beveled surface. In this respect, the trough is partially defined by the beveled surfaces of the first and second sections. The resilient material preferably comprises polyurethane which is molded between the top and bottom plates. Polyurethane is preferably used for the resilient material since it is highly resistant to degradation caused by environmental factors such as contamination via gas, oil, transmission fluid, brake fluid, power steering fluid, etc.

In the preferred embodiment, the top and bottom plates of the mount are configured to interlock with each other. In this respect, the top plate comprises a first portion which defines the top surface and includes a peripheral edge and a pair of apertures disposed therein. In addition to the first portion, the top plate comprises a downwardly bent second portion which defines the bottom surface and has an oblong window formed therein. Also disposed within the second portion of the top plate are a plurality of openings which are used to maintain the resilient material in firm engagement thereto. The bottom plate of the mount itself comprises a stem portion which has an oblong flange formed thereon. The oblong flange is complimentary to the oblong window, and is sized to be extensible therethrough. To facilitate the interlock of the top and bottom plates to each other, the oblong flange is extended through the oblong window and angularly offset relative thereto in a manner facilitating the capture of the oblong flange by the downwardly bent second portion of the top plate.

Advantageously, the interlock of the top and bottom plates prevents the same from separating from one another despite any degradation/failure of the resilient material disposed therebetween. As such, the automotive transmission mount constructed in accordance with the present invention will continue to function in its intended manner even if there is a failure of the resilient material within the mount. The top and bottom plates are each preferably fabricated from steel, though other materials may be utilized as an alternative.

The automotive transmission mount constructed in accordance with the present invention may further comprise a cover plate which is attached to the first portion of the top plate and is used to compress the upwardly extending portion of the resilient material so as to apply a preload to the flange of the bottom plate. In accordance with a first embodiment of the present invention, the cover plate has a generally rectangular configuration and includes a first pair of internally threaded apertures which are disposed in coaxial alignment with respective ones of the apertures within the first portion of the top plate. The cover plate further includes a second pair of apertures which are disposed outwardly relative to the peripheral edge of the first portion of top plate.

In accordance with a second embodiment of present invention, the cover plate has a generally rectangular configuration and includes a first pair of apertures which are disposed in coaxial alignment with respective ones of the apertures within the first portion of the top plate, and a second pair of apertures which are disposed outwardly relative to the peripheral edge of the first portion of the top plate. The cover plate constructed in accordance with the second embodiment further includes a pair of inwardly bent flange portions having a third pair of apertures disposed therein which are coaxially aligned with respective ones of the apertures of the second pair.

In accordance with a third embodiment of the present invention, the cover plate has a generally rectangular configuration and includes an opposed pair of end portions having a first pair of apertures disposed within respective ones thereof. The first pair of apertures are coaxially aligned with respective ones of the apertures withing the first portion of the top plate. Formed between the end portions is a recessed central portion. The recessed central portion compresses the upwardly extending portion of the resilient material when the cover plate is attached to the first portion of the top plate.

The cover plate is disposed between the top plate of the mount and the transmission housing, thus facilitating the compression of the upwardly extending portion of the resilient material thereby. The application of the preload to the flange of the bottom plate facilitated by the compression of the resilient material eliminates the need for adhesively bonding the resilient material to the top and bottom plates.

The automotive transmission mount of the present invention is preferably manufactured by placing the interlocked top and bottom plates into a mold, and subsequently injecting polyurethane into the mold. Thus, the top and bottom plates are configured so as to be locked together prior to the injection molding of the polyurethane thereabout.

BRIEF DESCRIPTION OF THE DRAWINGS

These, as well as other features of the present invention, will become more apparent upon reference to the drawings wherein:

FIG. 1 is a perspective view of the automotive transmission mount constructed in accordance with the present invention;

FIG. 2 is an exploded view of the top and bottom plates of the transmission mount shown in FIG. 1;

FIG. 3 is a cross-sectional view taken along line 3—3 of FIG. 1, and further illustrating a first embodiment of a cover plate which may be included in the transmission mount;

FIG. 4 is a cross-sectional view illustrating the compression of the resilient material of the transmission mount by the cover plate constructed in accordance with the first embodiment;

FIG. 5 is top perspective view of the cover plates shown in FIGS. 3 and 4;

FIG. 6 is a top perspective view of a cover plate constructed in accordance with a second embodiment of the present invention which may be used as an alternative to the cover plates shown in FIGS. 3–5; and FIG. 7 is a top perspective view of a cover plate constructed in accordance with a third embodiment of the present invention which may be used as an alternative to the cover plates shown in FIGS. 5 and 6.

DETAILED DESCRIPTION OF THE PREFERRED EMBODIMENTS

Referring now to the drawings wherein the showings are for purposes of illustrating preferred embodiments of the present invention only, and not purposes of limiting the same, FIG. 1 perspectively illustrates the automotive transmission mount 10 constructed in accordance with the present invention. Referring now to FIGS. 1 and 2, the mount 10 comprises a top plate 12 which is configured for attachment to the housing of a transmission. In the preferred embodiment, the top plate 12 comprises a first portion 14 which itself comprises an opposed pair of identically configured, outwardly extending flanges 16. The flanges 16 each define a generally planar top surface 18 and a peripheral edge 20. The top surfaces 18 of the flanges 16 collectively define the top surface of the top plate 12. Disposed within respective ones of the flanges 16 is a pair of elongate apertures 22, the use of which will be discussed in more detail below.

In addition to the first portion 14, the top plate 12 of the mount 10 includes a downwardly bent second portion 24 which itself defines the bottom surface of the top plate 12. Formed in the second portion 24 of the top plate 12 is an oblong window 26. In this respect, the window 26 is provided in the general shape of a circle having two flat sides, i.e., cords of the circle, formed thereon. Also formed within the second portion 24 of the top plate 12 are a plurality, and in particular four (4), rectangularly configured openings 27, the use of which will be discussed in more detail below. The top plate 12 is preferably fabricated from steel, though other materials may be utilized as an alternative.

In addition to the top plate 12, the mount 10 of the present invention comprises a bottom plate 28 which is configured for attachment to a vehicle frame, and in particular to the cross-arm of the vehicle. Referring now to FIGS. 2 and 3, the bottom plate 28 includes a rectangularly configured base portion 30 which includes a tubular, cylindrically configured stem portion 32 attached to and extending perpendicularly from the center of one side thereof. Formed on the distal end of the stem portion 32 is an oblong flange 34 which has a configuration complimentary to that of the oblong window 26, and is sized to be extensible therethrough. Both the base portion 30 and stem portion 32 of the bottom plate 28 are preferably fabricated from steel, with the stem portion 32 preferably being attached to the base portion 30 via a weld 36. Disposed within the base portion 30 on opposed sides of the stem portion 32 is a pair of internally threaded apertures 38. Additionally, as seen in FIG. 3, disposed within the approximate center of the base portion 30 is an internally threaded aperture 40 which communicates with the hollow interior of the stem portion 32. The apertures 38, 40 are linearly aligned within the base portion 30.

As further seen in FIG. 2 and 3, in the preferred embodiment of the present invention, the top and bottom plates 12, 28 are adapted to interlock with each other. Such interlock is facilitated by the extension of the oblong flange 34 through the oblong window 26 and subsequent rotation of the base portion 30 so as to angularly offset the flange 34 and window 26 relative to each other. In this respect, when the top and bottom plates 12, 28 are properly interlocked, the opposed, lateral ends of the base portion 30 extend toward the flanges 16 of the top plate 12. When the base portion 30 is oriented in this manner, the flange 34 is offset by approximately 90 degrees relative to the window 26. Thus, to facilitate the extension of the flange 34 through the window 26, the base portion 30 must be initially oriented such that the arcuate ends of the flange 34 are aligned with the arcuate ends of the window 26, i.e., the lateral ends of the base portion 30 extend perpendicularly relative to the outwardly extending flanges 16. Subsequent to the extension of the flange 34 through the window 26, the rotation of the base portion 30 approximately 90 degrees facilitates the desired extension of the lateral ends thereof toward the flanges 16, and the interlock of the top and bottom plates 12, 28 to each other. As will be recognized, when the base portion 30 is oriented in this manner, the separation of the top and bottom plates 12, 28 is prevented by the capture of the flange 34 by the second portion 24 of the top plate 12.

Referring now to FIGS. 1 and 3, the transmission mount 10 of the present invention further comprises a mass 42 of resilient material which is disposed between the interlocked top and bottom plates 12, 28. The resilient material comprising the mass 42 is preferably polyurethane which is molded between the top and bottom plates 12, 28. When molded between the top and bottom plates 12, 28, the resilient material comprising the mass 42 flows into the openings 27 within the second portion 24 of the top plate 12 which aids in maintaining the mass 42 in firm engagement thereto. Advantageously, the formation of the mass 42 from polyurethane provides resistance to its degradation from soiling, environmental contamination, and exposure to automotive fluids such as petroleum products (e.g., gasoline, oil, transmission fluid, brake fluid, power steering fluid, etc.).

In the preferred embodiment, though the top and bottom plates 12, 28 are interlocked when the polyurethane mass 42 is molded therebetween, they do not directly contact each other. In this respect, as seen in FIG. 3, the mass 42 is formed between the downwardly extending second portion 24 of the top plate 12, and the base portion 30, stem portion 32 and flange 34 of the bottom plate 28. In addition to completely encapsulating the stem portion 32 and flange 34, the mass 42 substantially encapsulates the base portion 30, except for the outer side thereof. In view of the manner in which the mass 42 is formed between the interlocked top and bottom plates 12, 28, the stem portion 32 resides within the window 26, with the flange 34 being separated from the second portion 24 of the top plate 12 by the mass 42.

As seen in FIGS. 1 and 2, the polyurethane mass 42 further includes an upwardly extending portion 44 which is formed so as to protrude beyond the top surfaces 18 of the flanges 16, and hence the top surface of the top plate 12. The upwardly extending portion 44 preferably defines identically configured first and second sections 46, 48 which are separated by a trough 50. The first and second sections 46, 48 each include a generally planar end surface 52 which is circumvented by a beveled surface 54. In this respect, the trough 50 is partially defined by portions of the beveled surfaces 54 of the first and second sections 46, 48.

Referring now to FIGS. 3-5, the transmission mount 10 constructed in accordance with the present invention may further comprise a cover plate 56 constructed in accordance with a first embodiment which is used to facilitate the attachment of the mount 10 to the transmission housing (not shown). Additionally, as will be discussed in more detail below, the cover plate 56 is used to compress the mass 42, and in particular the first and second sections 46, 48 thereof, so as to facilitate the application of a preload to the bottom plate 28.

The cover plate 56 has a generally rectangular configuration, and includes a first pair of internally threaded apertures 58 disposed therewithin. As best seen in FIGS. 3 and 4, the cover plate 56 is attached to the top plate 12 by initially placing the same upon the end surfaces 52 of the first and second sections 46, 48 such that the cover plate 56 extends over the flanges 16 of the top plate 12. Importantly, the apertures 58 of the first pair are oriented so as to be coaxially aligned with respective ones of the apertures 22 within the first portion 14 of the top plate 12 when the cover plate 56 is properly oriented upon the first and second sections 46, 48. As seen in FIG. 4, subsequent to the placement of the cover plate 56 upon the end surfaces 52, fasteners 60 such as bolts are extended through the apertures 22 and into the internally threaded apertures 58 of the first pair.

The subsequent tightening of the fasteners 60 draws the cover plate 56 toward the flanges 16 of the top plate 12, thus compressing the first and second sections 46, 48 of the polyurethane mass 42. As will be recognized, such compression is limited by the abutment of the cover plate 56 against the top surfaces 18 of the flanges 16. In addition to the apertures 58, the cover plate 56 includes a second pair of apertures 62 which are disposed outwardly relative to the peripheral edges 20 of the flanges 16 when the cover plate 56 is attached to the top plate 12 in the aforementioned manner. The apertures 62 of the second pair each define an enlarged counter bore which is disposed within the side of the cover plate 56 disposed closest to the flanges 16.

As previously explained, the attachment of the cover plate 56 to the top plate 12 facilitates the compression of the first and second sections 46, 48 of the upwardly extending portion 44, thus applying a preload to the bottom plate 28. Such preload is applied primarily to the flange 34 disposed on the distal end of the stem portion 32 of the bottom plate 28. In the transmission mount 10, the mass 42 is only mechanically bonded to the stem portion 32 and flange 34 of the bottom plate 28. As such, the bottom plate 28 is free-floating and will tend to move and loosen if the preload is not applied thereto. Thus, in the mount 10, the inclusion of the upwardly extending portion 44 of the mass 42, and in particular the first and second sections 46, 48 thereof, serves an important purpose in the functionality of the mount 10.

Referring now to FIG. 6, there is depicted a cover plate 64 which is constructed in accordance with a second embodiment of the present invention and may be used in the transmission mount 10 as an alternative to the previously described cover plate 56. The cover plate 64 also has a generally rectangular configuration, and includes a main body portion 66 having a first pair of apertures 68 disposed therein. The cover plate 64 is attached the top plate 12 by initially placing the main body portion 66 thereof upon the end surfaces 52 of the first and second sections 46, 48 of the mass 42. Like the previously described apertures 58, the apertures 68 are oriented so as to be coaxially aligned with respective ones of the apertures 22 of the top plate 12 when the cover plate 64 is properly oriented upon the upwardly extending portion 44 of the mass 42.

In addition to the apertures 68, the cover plate 64 of the second embodiment includes a second pair of apertures 70 which, like the apertures 62 of the cover plate 56, are disposed outwardly relative to the peripheral edges 20 the flanges 16 when the cover plate 64 is attached to the top plate 12. The cover plate 64 further includes a pair of identically configured, inwardly bent flange portions 72. Disposed within the flange portions 72 is a third pair of apertures 74 which are coaxially aligned with, but smaller in diameter than, respective ones of the apertures 70 of the second pair. When attached to the top plate 12, the cover plate 64, and in particular the main body portion 66 thereof, facilitates the compression of the first and second sections 46, 48 of the upwardly extending portion 44 of the mass 42, and hence the application of a preload to the bottom plate 28 in the same manner as previously described in relation to the cover plate 56.

Referring now to FIG. 7, there is depicted a cover plate 76 which is constructed in accordance with a third embodiment of the present invention and may be used in the transmission mount 10 as an alternative to the previously described cover plates 56, 64. The cover plate 76 also has a generally rectangular configuration, and includes an opposed pair of end portions 78. Disposed within respective ones of the end portions 78 is a first pair of apertures 80 which are coaxially aligned with respective ones of the apertures 22 of the top plate 12 when the cover plate 76 is properly oriented upon the upwardly extending portion 44 of the mass 42. Formed between the end portions 78 is a recessed central portion 82. The central portion 82 is adapted to compress the upwardly extending portion 44 of the mass 42 when the cover plate 76 is attached to the first portion 14 of the top plate 12.

The transmission mount 10 of the present invention is attached to the cross-arm of the vehicle frame by the receipt of studs or bolts extending upwardly from the cross-arm into respective ones of the internally threaded apertures 38, 40 of the bottom plate 28. To facilitate the attachment of the top plate 12 to the transmission housing, it will be recognized that the cover plates 56, 64 need not be included in the transmission mount 10. In this respect, the transmission housing may include studs or bolts extending downwardly therefrom which are extended through respective ones of the apertures 22 within the flanges 16 of the top plate 12. Importantly, the application of nuts to the studs or bolts and subsequent tightening thereof will facilitate the compression of the first and second sections 46, 48 of the upwardly extending portion 44 of the mass 42 directly by the transmission housing.

The cover plates 56, 64 are optionally used to interface the transmission mount 10 to the transmission housings of different makes of vehicles. In this respect, when the cover plate 56 is utilized, bolts are extended upwardly through the apertures 62 and threadably received into the transmission housing. Similarly, when the cover plate 64 is used, bolts are extended upwardly through the apertures 70, 74 and into the transmission housing. The optional inclusion of the cover plates 56, 64 with the transmission mount 10 provides the same with virtually universal adaptability to different makes of vehicles to facilitate the interface of the transmission to the cross-arm of the vehicle frame.

As previously explained, the application of the preload to the bottom plate 28 facilitated by the compression of the first and second sections 46, 48 prevents excessive movement and loosening of the bottom plate 28 when the transmission mount 10 is functioning to dampen vibrations. Importantly, even in the event that the polyurethane mass 42 cracks, ruptures or otherwise fails within the transmission mount 10, the interlock of the top and bottom plates 12, 28 to each other in the aforementioned manner prevents the same from being separated despite the failure of the mass 42. As such, the reliability of the transmission mount 10 constructed in accordance with the present invention is substantially increased since any failure of the mass 42 does not result in the separation of the top and bottom plates 12, 28 from each other. The application of the preload further eliminates the need to adhesively bond the mass 42 to the top and bottom plates 12, 28.

The automotive transmission mount 10 constructed in accordance with the present invention is preferably formed by initially placing the top and bottom plates 12, 28 into a suitable mold subsequent to the interlock thereof in the aforementioned manner. Thereafter, polyurethane material is injected into the mold, and subsequently cooled so as to form the mass 42.

Additional modifications and improvements of the present invention may also be apparent to those skilled in the art. For example, various configurations of the top and bottom plates 12, 28 are contemplated, as well as alternative configurations of the cover plates 56, 64 as needed to facilitate the interface of the transmission mount 10 to the transmission housing and cross-arm of the vehicle frame. In this respect, the various apertures disposed within the top and bottom plates 12, 28 and cover plates 56, 64 may be oriented in varying patterns for adaptability with the transmissions and vehicle frames of different makes of vehicles. As such, the particular combination of parts described and illustrated herein is intended to represent only certain embodiments of the present invention, and is not intended to serve as limitations of alternative devices within the spirit and scope of the invention.

What is claimed is:

1. An automotive transmission mount comprising:
    a) a top plate configured for attachment to a transmission housing and defining top and bottom surfaces;
    b) a bottom plate configured for attachment to a vehicle frame; and
    c) a resilient material disposed between the top and bottom plates and including an upwardly extending portion which protrudes beyond the top surface of the top plate.

2. The mount of claim 1 wherein said upwardly extending portion defines first and second sections which are separated by a trough.

3. The mount of claim 2 wherein said first and second sections are identically configured.

4. The mount of claim 2 wherein said first and second sections each include a generally planar end surface which is circumvented by a beveled surface, said trough being partially defined by portions of the beveled surfaces of the first and second sections.

5. The mount of claim 2 further comprising a cover plate for compressing the upwardly extending portion of said resilient material so as to apply a preload to said bottom plate.

6. The mount of claim 2 wherein said resilient material comprises polyurethane.

7. The mount of claim 6 wherein the polyurethane is molded between the top and bottom plates.

8. The mount of claim 2 wherein said top and bottom plates are configured to interlock with each other.

9. The mount of claim 8 wherein:
    a) the top plate comprises a first portion defining the top surface and including a peripheral edge and a pair of apertures disposed therein, and a downwardly bent second portion defining the bottom surface and having a window formed therein;

b) said bottom plate comprises a stem portion having a flange formed thereon; and c) said stem portion is received within the window such that said flange is captured by the downwardly bent second portion of said top plate.

10. The mount of claim 9 wherein:

(a) the window formed in the downwardly bent second portion of the top plate has an oblong shape;

(b) the flange formed on the stem portion of the bottom plate has an oblong shape which is complementary to the window and sized to be extensible therethrough; and (c) the flange is extended through the window and angularly offset relative thereto in a manner facilitating the capture of the flange by the downwardly bent second portion of the top plate.

11. The mount of claim 9 further comprising a cover plate attached to the first portion of the top plate for compressing the upwardly extending portion of the resilient material so as to apply a preload to the flange of the bottom plate.

12. The mount of claim 11 wherein said cover plate has a generally rectangular configuration and includes:

a) a first pair of apertures which are disposed in coaxial alignment with respective ones of the apertures within the first portion of the top plate; and b) a second pair of apertures which are disposed outwardly relative to the peripheral edge of the first portion of the top plate.

13. The mount of claim 12 wherein the apertures of the first pair are each internally threaded.

14. The mount of claim 11 wherein said cover plate has a generally rectangular configuration and includes:

a) a first pair of apertures which are disposed in coaxial alignment with respective ones of the apertures within the first portion of the top plate;

b) a second pair of apertures which are disposed outwardly relative to the peripheral edge of the first portion of the top plate; and c) a pair of inwardly bent flange portions including a third pair of apertures disposed therein which are coaxially aligned with respective ones of the apertures of the second pair.

15. The mount of claim 11 wherein the cover plate has a generally rectangular configuration and includes:

(a) an opposed pair of end portions, each of said end portions having an aperture disposed therein which is coaxially aligned with a respective one of the apertures within the first portion of the top plate; and (b) a recessed central portion formed between the end portions, said central portion compressing the upwardly extending portion of the resilient material when the cover plate is attached to the first portion of the top plate.

16. The mount of claim 9 wherein the second portion of the top plate includes a plurality of openings disposed therein for maintaining the resilient material in firm engagement thereto.

17. The mount of claim 8 wherein the top plate includes an oblong window formed therein and the bottom plate includes an oblong flange formed thereon which is extended through the oblong window and angularly offset relative thereto so as to interlock said top plate and said bottom plate.

18. An automotive transmission mount comprising:

a) a top plate configured for attachment to a transmission housing and defining top and bottom surfaces;

b) a bottom plate configured for attachment to a vehicle frame, the bottom plate being interlocked with the top plate to prevent the separation of the top and bottom plates from each other; and c) a resilient material disposed between the top and bottom plates and including an upwardly extending portion which protrudes beyond the top surface of the top plate and defines first and second sections separated by a trough.

\* \* \* \* \*